March 1, 1966   J. E. MORGAN   3,238,053
ELECTROSTATIC DECORATION OF HOT GLASS
Filed April 2, 1962

INVENTOR
JACK E. MORGAN
BY
ATTORNEY 3,238,053
ELECTROSTATIC DECORATION OF HOT GLASS
Jack E. Morgan, Wycliffe, Wilmington, Del., assignor to E. I. du Pont de Nemours and Company, Wilmington, Del., a corporation of Delaware
Filed Apr. 2, 1962, Ser. No. 184,175
4 Claims. (Cl. 117—17.5)

This invention relates to the electrostatic decoration of hot glass, and in particular it relates to the electrostatic projection of a design in a glass color on a hot bottle while it is still hot after it has been formed in a glass forming mold.

By the term "glass color" as used throughout the specification and claims is meant a color composed largely of glass frit and an inorganic heat resistant pigment which is applied to glass and caused to be fused thereon by firing to form a permanent design on the glass. Such glass colors are well known in the art and are sold by numerous manufacturers thereof.

Heretofore in the decoration of glass with glass colors it has been necessary to combine the glass colors with a vehicle such as alcohol, water, pine oil, lavender oil, wax, resin-wax or the like. The glass bottles, after forming in a glass forming mold, in order to prevent the setting-up therein of undue strains, are passed from the forming mold through an annealing lehr to gradually cool the same, then apply the glass color composition, then dry the label and fire the glass color on the bottle, and finally again anneal the bottle in an annealing lehr to gradually cool the same.

Attempts have been made to apply the glass colors while the glass article is still hot from the forming lehr, but such attempts have not been satisfactory.

Advances in glass making technology have created a glass container that is competitive with other presently used one-trip containers. There has for some time been a need of providing a permanent yet cheap label on such glass containers. In order to maintain the present economic position of one way bottles and also improve costs on returnable bottles which are now decorated as a separate step after the making of the glass bottle has been completed, it is highly desirable to integrate the decorating process with the glass forming and annealing process.

It is therefore an object of this invention to provide a process for the decoration of glass articles that will largely avoid two annealing operations.

It is another object of this invention to project a glass color onto a hot glass article immediately after it leaves the glass forming mold without contacting the hot article with any cold element other than said color.

It is another object of this invention to project a glass color onto a hot glass article without any other contact with a cold object and forwarding said glass color decorated article through a cooling lehr.

Other objects of the invention will appear from the following description.

The above objects may be accomplished, in general, by projecting a glass color through an electrostatically charged foraminous metal member containing the desired design in perforations therein onto a spaced oppositely electrostatically charged hot glass article to be decorated, causing the glass color to be fused, and cooling the hot glass article. By the term "oppositely electrostatically charged" is meant oppositely charged relative to each other, it being understood that the foraminous metal member may be charged with a high tension current and the glass article may be grounded.

Several embodiments of the invention are illustrated in the accompanying drawings, in which.

Figure 1:
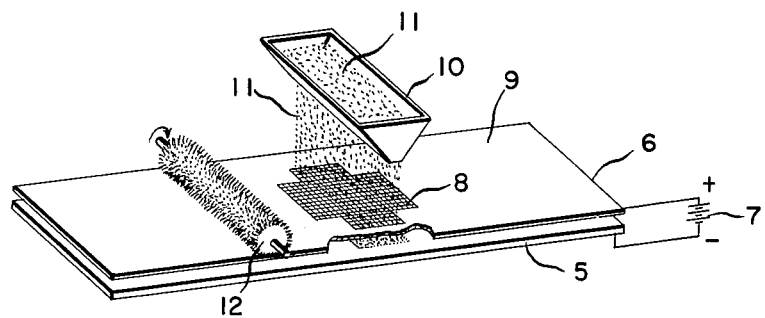
FIG. 1 is a diagrammatic perspective view of one embodiment of the invention.

Referring to FIG. 1, 5 designates a hot glass sheet having a temperature sufficiently elevated that it will take an electrostatic charge, i.e. a temperature in excess of 400° C. Numeral 6 designates a tungsten wire screen in which part 9 is blocked out with a polyfluoroethylene resin in the manner disclosed in Short U.S. Patent No. 2,860,576, leaving the design 8 in open mesh for the passage of glass color particles therethrough. Screen 6 and hot glass plate 5 are spaced from each other a distance of from about $1/16$ inch to about $5/16$ inch and are oppositely electrostatically charged with a high voltage source of electricity 7. Glass color particles 11 are dusted from trough 10 onto open mesh design 8 and brushed through the design by rotating and reciprocating brush 12. The details of the manner of rotating and reciprocating brush 12 are not shown since the necessary mechanism to accomplish this is obvious.

The particles of glass color will accept the electrostatic charge of screen 6 and will be repelled or projected onto the oppositely charged glass plate 5. These glass color particles adhere to the glass plate by reason of its having a temperature near the softening point of the glass particles and by the electrostatic force.

The glass plate may then be removed and, if necessary, fired at a temperature that will completely fuse the glass color particles to a glossy color after which the plate may be gradaully cooled in a cooling lehr.

Figure 2:
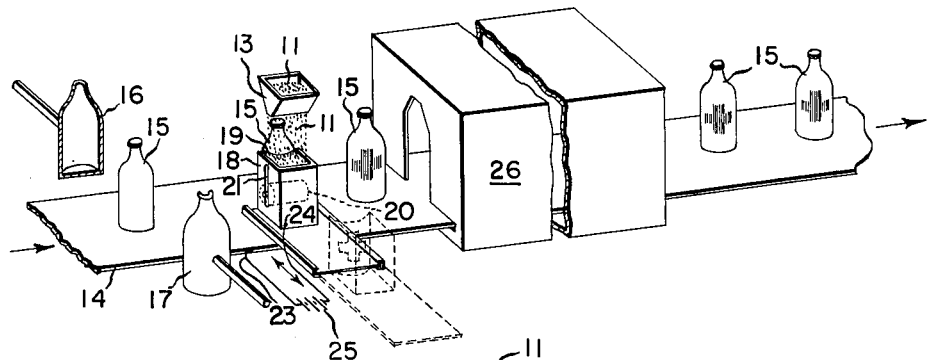
FIG. 2 is a diagrammatic perspective view of an embodiment in which a series of bottles are continously decorated as they are formed by a forming mold.
Figure 3:
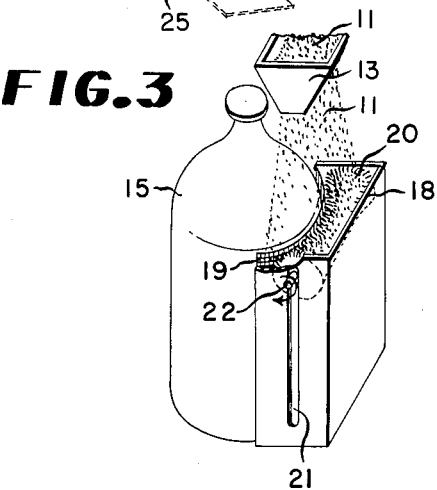
FIG. 3 is an enlarged perspective view showing in greater detail the decoration of a bottle as shown in FIG. 2.

Referring to FIGS. 2 and 3, the hot bottle 15 immediately after removal from the forming mold 16, 17 is positioned on a metal belt 14. This belt 14 will have a temperature of the order of the hot bottle 15 and may be composed of stainless steel, brass, iron or other metal that will be electrically conducting. The belt will be moved at intervals to definite stations whereby it will be decorated and annealed. At the decorating station shown, the metal container 18 having a metal screen 19, curved to the approximate curvature of the bottle, is moved to a position where the curved screen 19 will be within a distance of $1/16$ inch to $5/16$ inch from the surface of the hot bottle. The metal belt 14 and the metal container 18 are oppositely charged with a high tension source of electricity 25. The belt is charged by the brush 23 and the container 18 by connection 24 leading from electric source 25. The hot bottle 15 receives its high voltage electrostatic charge from belt 14 and the screen 19 is oppositely charged through connection with container 18.

Finely divided particles 11 of glass color are dusted from trough 13 into the container 18. These particles are brushed into screen 19 by brush 20 which is rotated and rides up and down in slot 21 guided by shaft 22 (see FIG. 3). The oppositely charged screen 19 and bottle 15 cause the particles 11 to be attracted to the hot bottle 15. The hot bottle may be at a sufficiently high temperature to fuse the glass color on the bottle. Alternatively, the hot bottle may be reheated to the fusing temperature of the glass enamel in the first part of annealing lehr 26. The cooled bottles 15, containing the glass color decoration are removed at the opposite end of the annealing lehr.

Although it has heretofore been recognized that glass, at an elevated temperature, will have a certain degree of conductivity, it was not known that glass at a temperature of over 400° C., preferably 550 to 650° C., would have a sufficient conductivity to accept an electrostatic charge of an intensity that it will attract oppositely charged, relatively cold, glass colors. Moreover, it has now been discovered that glass normally used in one-trip throw-away bottles will have a conductivity when hot that is particularly adapted to the electrostatic decoration with glass colors. Such bottle glass has substantially the following composition, in percent by weight:

|  | Percent |
| --- | --- |
| $SiO_2$ | 65 to 75 |
| $Al_2O_3$ | .25 to 6 |
| $Fe_2O_3$ | .06 to 2.5 |
| CaO | .5 to 14 |
| MgO | 0 to 3.7 |
| $Na_2O$ | 10 to 20 |

Other metal oxides not to exceed 5%.

Soda lime silica glass should be preferably heated to a temperature in the range of 500–600° C. since at these temperatures the measured potential over the entire glass surface is uniform.

A voltage of between 1,000 and 7,000 volts is applied between the screen and hot glass article. This voltage must be sufficiently high to force the glass color particles in a straight path from the screen to the glass but must not be so high as to cause any arcing between these spaced oppositely charged surfaces. With a proper electrostatic force the particles have been found to stream across the space, following the electrical lines of force, and deposit the particles on the glass surface. As a result of such straight line travel a printed pattern is a true reproduction of the stencil.

The screen must be made from a heat resistant, electrically conducting metal, for example, iron, steel, stainless steel, brass, copper or the like. Preferably, however, the screen should be woven from a low heat expansible wire such as tungsten, nickel, "Invar" or similar material to prevent loosening or bagging of the screen surface. The blocked out portions of the screen stencil may be filled in with any heat resistant material. Very good results have been obtained by the use of polytetrafluoroethylene and polysilicone resins in the manner disclosed in Short Patent No. 2,860,576. Alternatively, the screen may be blocked out by the use of copper foil or aluminum foil. Such metal foils may be etched by known techniques to remove only such portions as called for by the desired design.

The glass color, as above indicated, is composed substantially entirely of glass frit and inorganic pigment. The glass frit may consist of a wide variety of glass compositions. The lower melting glasses have some advantage over high melting glasses. Relatively low melting glass tumbler enamels composed of high lead borosilicate glass, for example, PbO 10–55%, $B_2O_3$ 3–7%, $SiO_2$ 20–30%, $TiO_2$ 0–5%, ZnO 0–5%, $PbF_2$ 0–15%, $ZnO_2$ 0–6%, $Na_2O$ 4–14% are particularly suitable since they usually melt the instant they strike the hot glass and remain fixed by their own adhesion.

The glass article to be decorated should be as hot as possible from the forming mold when subjected to decoration by this process. A glass color composed of a low melting frit may be completely fused at the time of electrostatic application. It is generally desired, however, to provide for some reheating to complete the fusing of the glass color and obtain leveling of the applied color. This may be readily done in the fore part of the annealing lehr.

The pigments used in the glass colors may be of any kind commonly used in glass color decoration. Cadmium sulfoselinide yellows, oranges and reds, copper cobalt blacks, cobalt alumina blues, titania whites and other dispersed pigments are satisfactory. Colorants that result in transparent colored enamels such as lead chromate, cobalt oxide and the like may also be used.

The following examples are given to illustrate certain preferred methods of practicing the invention. The details of these examples are not to be considered as limiting the invention thereto:

*Example I*

A flat glass plate, 4" x 6", was heated to 700° C. A piece of fire brick was used as a support and heating was continued until the ends of the glass overhanging the fire brick sagged to about a 45° angle. The heated assembly was removed from the furnace and placed under a polytetrafluoroethylene blocked stencil screen. The spacing of the glass from the screen was about ¼ inch. Sag of the screen due to heat reduced this space to about ⅛ inch. A potential was applied between the one end of the glass and the metal screen of 5,000 volts D.C. A voltmeter was connected to the other end of the glass and to the screen. This meter read 5,000 volts at the end of the test. A low melting black glass color (usual maturing range about 500° C.) was brushed through the screen onto the glass. A fairly sharp print of the screen pattern was produced. The glass plate was then placed in an annealing lehr containing heating means in the front part thereof whereby to reheat the plate to the melting temperature of the applied glass color. The decorated glass plate was quite attractive in appearance.

*Example II*

The above test was repeated without a voltage difference applied. The pattern was considerably more diffuse and lacked the detail of the print of Example I.

*Example III*

The test of Example I was repeated using a standard black glass color (copper cobalt black pigment) and a lead alkali borosilicate frit with maturing temperature about 580–600° C. The powder did not melt when it hit the hot glass sheet but required refiring to about 600° C. to obtain a glossy pattern.

*Example IV*

Test of Example III was repeated using a red glass color (cadmium sulfoselinide pigment and a lead-cadmium-alkali-borosilicate frit) and a satisfactory print was obtained after refiring to a temperature of 620° C. and annealing.

*Example V*

A glass bottle may be satisfactorily decorated as follows:

Heat the glass bottle to the point of incipient softening and place same on a hot wire mat. Position a curved stencil screen with the desired design within a distance of ¼ inch from said bottle as shown in FIG. 2 of the drawings. Apply a voltage of 5,000 volts D.C. between the screen and said wire mat. Brush a black enamel glass color through the screen into the charge space between the screen and the bottle. Pass the bottle into an annealing lehr provided in the front with means for heating the bottle to a temperature of 620° C. and then pass through the annealing lehr. A satisfactory decoration will be obtained on the glass bottle.

Reference in the specification and claims to percentages refers to percentages by weight.

Since it is obvious that many changes and modifications can be made in the above-described details without departing from the nature and spirit of the invention, it is to be understood that the invention is not to be limited thereto except as set forth in the appended claims.

I claim:

1. The method for the electrostatic decoration of glass which comprises projecting a finely divided glass color through an electrostatically charged foraminous metal member constituting a desired design in perforations adapted to electrically charge said glass color, onto a spaced oppositely charged glass article to be decorated having a sufficiently high temperature to cause said glass color to be fused thereon, whereby said glasss article may be formed and decorated with a glass color by a single annealing operation.

2. The method for the electrostatic decoration of glass which comprises projecting a finely divided glass color through an electrostatically charged foraminous metal member constituting a desired design in perforations adapted to electrically charge said glass color, onto a spaced oppositely charged glass article to be decorated having a temperature in excess of 400° C., fusing said glass color to the desired smoothness, whereby said glass article may be formed and decorated with a glass color by a single annealing operation.

3. The method for the electrostatic decoration of glass which comprises positioning a foraminous metal member constituting a desired design in perforations adapted to electrically charge glass color particles when said member is electrically charged and said particles are moved therethrough, at a distance of about 1/16 inch to 5/16 inch from a glasss article having a sufficiently high temperature to cause the fusing of a finely divided glass color on the surface thereof, charging said member and glass article with opposite electrostatic charges of sufficient voltage to cause glass color particles to be projected in a straight line from said member to said glass article, moving finely divided glass color particles through said member toward said glass article whereby said particles are projected on said hot glass surface and caused to be fused thereon, whereby said glass article may be formed and decorated with a glass color by a single annealing operation.

4. The method for the electrostatic decoration of glass which comprises positioning a foraminous metal member constituting a desired design in perforations adapted to electrically charge glass color particles when said member is electrically charged and said particles are moved therethrough, at a distance of about 1/16 inch to 5/16 inch from a glass article having a temperature in excess of 400° C., charging said member and glass article with opposite electrostatic charges of between 1,000 and 7,000 volts and of sufficient force to project finely divided glass color particles in a straight line from said member to said glass article, moving finely divided glass color particles through said member toward said glass article whereby said particles are projected on said hot glass surface, causing said particles to be fused to the surface of said glass, whereby said glass article may be formed and decorated with a glass color by a single annealing operation.

References Cited by the Examiner

UNITED STATES PATENTS

| | | | |
|---|---|---|---|
| 398,995 | 3/1889 | Atterbury | 117—18 |
| 839,187 | 12/1906 | Norton | 117—25 |
| 2,067,949 | 1/1937 | Rez | 65—60 |
| 2,152,077 | 3/1939 | Meston et al. | 117—17.5 |
| 2,162,317 | 6/1939 | Rez | 117—23 X |
| 2,502,758 | 4/1950 | Short | 65—60 X |
| 2,571,608 | 10/1951 | Plagge | 117—17 X |
| 2,787,556 | 4/1957 | Haas | 117—17.5 |
| 2,940,864 | 6/1960 | Watson | 117—17 |
| 2,966,429 | 12/1960 | Darrel et al. | 117—38 X |
| 2,995,463 | 8/1961 | Meister et al. | 117—93.4 X |
| 3,058,443 | 10/1962 | Paton | 117—17 |

WILLIAM D. MARTIN, *Primary Examiner.*

DONALL H. SYLVESTER, *Examiner.*